US011836632B2

United States Patent
Xie et al.

(10) Patent No.: US 11,836,632 B2
(45) Date of Patent: Dec. 5, 2023

(54) METHOD AND SYSTEM FOR IMAGE CLASSIFICATION

(71) Applicant: Agency for Science, Technology and Research, Singapore (SG)

(72) Inventors: Shudong Xie, Singapore (SG); Yiqun Li, Singapore (SG); Dongyun Lin, Singapore (SG); Tin Lay Nwe Ma, Singapore (SG); Sheng Dong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 112 days.

(21) Appl. No.: 17/598,135

(22) PCT Filed: Mar. 26, 2020

(86) PCT No.: PCT/SG2020/050169
§ 371 (c)(1),
(2) Date: Sep. 24, 2021

(87) PCT Pub. No.: WO2020/197501
PCT Pub. Date: Oct. 1, 2020

(65) Prior Publication Data
US 2022/0189143 A1 Jun. 16, 2022

(30) Foreign Application Priority Data
Mar. 26, 2019 (SG) .......................... 10201902708Y

(51) Int. Cl.
G06V 10/764 (2022.01)
G06V 10/77 (2022.01)
(Continued)

(52) U.S. Cl.
CPC .......... *G06N 3/084* (2013.01); *G06V 10/765* (2022.01); *G06V 10/7715* (2022.01); *G06V 10/7747* (2022.01); *G06V 10/82* (2022.01)

(58) Field of Classification Search
CPC .. G06N 3/084; G06V 10/7747; G06V 10/765; G06V 10/7715; G06V 10/82
See application file for complete search history.

(56) References Cited

U.S. PATENT DOCUMENTS 6,728,689 B1   4/2004  Drissi et al.
2006/0111644 A1*  5/2006  Guttag ................. A61B 5/7267
                                                                  600/544
(Continued)

FOREIGN PATENT DOCUMENTS

CN    101178773 A    5/2008
CN    104239501 A    12/2014

OTHER PUBLICATIONS

International Search Report for International Application No. PCT/SG2020/050169 dated Aug. 3, 2020, pp. 1-3.
(Continued)

*Primary Examiner* — David F Dunphy
(74) *Attorney, Agent, or Firm* — Shackelford, Bowen, McKinley & Norton, LLP

(57) ABSTRACT

There is provided a method of image classification. The method includes: providing a set of category mapping discriminators, each corresponding to a respective category, wherein each category mapping discriminator of the set of category mapping discriminators is configured for discriminating features relating to input images that belong to the respective category of the category mapping discriminator; extracting a plurality of features from an input image using a machine learning model; determining, for each of the set of category mapping discriminators, an output value based on the plurality of extracted features using the category
(Continued)

mapping discriminator; and determining a classification of the input image based on the output values of the set of category mapping discriminators.

18 Claims, 13 Drawing Sheets

(51) Int. Cl.
*G06V 10/774* (2022.01)
*G06V 10/82* (2022.01)
*G06N 3/084* (2023.01)

(56) References Cited

U.S. PATENT DOCUMENTS

| | | | |
|---|---|---|---|
| 2009/0083332 | A1 | 3/2009 | Datta et al. |
| 2014/0279741 | A1 | 9/2014 | Sow et al. |
| 2016/0217394 | A1* | 7/2016 | Silberman ............ A61B 5/7264 |
| 2016/0350336 | A1* | 12/2016 | Checka ................ G06V 10/454 |
| 2018/0012107 | A1 | 1/2018 | Xu et al. |

OTHER PUBLICATIONS

Written Opinion of the International Searching Authority for International Application No. PCT/SG2020/050169 dated Aug. 3, 2020, pp. 1-5.
Yoshua Bengio, "Deep Learning of Representations for Unsupervised and Transfer Learning," Workshop and Conference Proceedings, vol. 27, 2012, pp. 17-37.
Donahue et al., "DeCAF: A Deep Convolutional Activation Feature for Generic Visual Recognition," arXiv:1310.1531v1, Oct. 6, 2013, pp. 1-10.
Fei-Fei et al., "One-Shot Learning of Object Categories," IEEE Transactions on Pattern Analysis and Machine Intelligence, vol. 28, No. 4, Apr. 2006, pp. 594-611.
Finn et al., "Model-Agnositc Meta-Learning for Fast Adaptation of Deep Networks," International Conference on Machine Learning, Sydney, Australia, 2017, pp. 1-10.
Gidaris et al., "Dynamic Few-Shot Visual Learning Without Forgetting," Proceedings of the IEEE Conference on Computer Vision and Pattern Recognition, 2018, pp. 4367-4375.
He et al., "Deep Residual Learning for Image Recognition," Proceedings of the IEEE Conference on Computer Vision and Pattern Recognition, 2016, pp. 770-778.
Koch et al., "Siamese Neural Network for One-Shot Image Recognition," ICML Deep Learning Workshop, vol. 2, 2015, pp. 1-8.
Alex Krizhevsky, "Learning Multiple Layers of Features from Tiny Images," Technical Report, Apr. 8, 2009, pp. 1-58.
Krizhevsky et al., "ImageNet Classification with Deep Convolutional Neural Networks," Advance in Neural Information Processing Systems, 2012, pp. 1097-1105.
Lake et al., "One Shot Learning of Simple Visual Concepts," Proceedings of the Annual Meeting of the Cognitive Science Society, vol. 33, 2011, pp. 1-6.
Lecun et al., "Gradient-Based Learning Applied to Document Recognition," Proceedings of the IEEE, Nov. 1998, vol. 86, No. 11, pp. 2278-2324.
Li et al., "Learning Without Forgetting," IEEE Transactions on Pattern Analysis and Machine Intelligence, vol. 40, No. 12, Dec. 2018, pp. 2935-2947.
Li et al., "Meta-SGD: Learning to Learn Quickly for Few-Shot Learning," arXiv:1707.09835v2, Sep. 28, 2017, pp. 1-11.
Lopez-Paz et al., "Gradient Episodic Memory for Continual Learning," 31st Conference on Neural Information Processing Systems, 2017, pp. 1-10.
Robert M. French, "Catastrophic Forgetting in Connectionist Networks: Causes, Consequences and Solutions," Trends in Cognitive Sciences, vol. 3, No. 4, 1999, pp. 128-135.
McCloskey et al., "Catastrophic Interference in Connectionist Networks: The Sequential Learning Problem," Academic Press, 1989, pp. 109-165.
Nilsback et al., "Automated Flower Classification Over a Large Number of Classes," Sixth Indian Conference on Computer Vision, Graphics & Image Processing, Dec. 2008, pp. 722-729.
Qiao et al., "Few-Shot Image Recognition by Predicting Parameters from Activations," arXiv:1706.03466v3, Nov. 25, 2017, pp. 1-10.
Ravi et al., "Optmization as a Model for Few-Shot Learning," International Conference on Learning Representations, 2017, pp. 1-11.
Rebuffi et al., "Learning Multiple Visual Domains with Residual Adapters," arXiv:1705.08045v5, Nov. 27, 2017, pp. 1-12.
Rebuffi et al., "iCaRL: Incremental Classifier and Representation Learning," IEEE Conference on Computer Vision and Pattern Recognition, 2017, pp. 5533-5542.
Simonyan et al., "Very Deep Convolutional Networks for Large-Scale Image Recognition," arXiv:1409.1556v6, Apr. 10, 2015, pp. 1-14.
Snell et al., "Prototypical Networks for Few-Shot Learning," arXiv:1703.05175v2, Jun. 19, 2017, pp. 1-13.
Sung et al., "Learning to Compare: Relation Network for Few-Shot Learning," arXiv:1711.06025v2, Mar. 27, 2018, pp. 1-10.
Vinyals et al., "Matching Networks for One Shot Learning, " arXiv:1606.04080v2, Dec. 29, 2017, pp. 1-12.
Wah et al., "The Caltech-UCSD Birds-200-2011 Dataset, "Technical Report, California Institute of Technology, 2011, pp. 1-8.
Wu et al., "Incremental Classifier Learning with Generative Adversarial Networks," arXiv:1802.00853v1, Feb. 2, 2018, pp. 1-10.
Xiao et al., "SUN Database: Large-Scale Scene Recognition from Abbey to Zoo," IEEE Conference on Computer Vision and Pattern Recognition, 2010, pp. 3485-3492.
Yoon et al., "Lifelong Learning with Dynamically Expandable Networks," arXiv:1708.01547v1, Jun. 11, 2018, pp. 1-11.
Zhou et al., "Deep Meta-Learning: Learning to Learn in the Concept Space," arXiv:1802.03596v1, Feb. 10, 2018, pp. 1-10.

* cited by examiner

Algorithm 1: Meta-Training of Module Generator

Input: task distribution $p(\tau)$ over a meta-set $\mathcal{D}_{train}$
Output: parameters $\theta$ of $G$ 1    $\theta \leftarrow \text{Initialize}(\theta)$
2    while *not done* do
3       $\mathcal{T} \leftarrow$ sample a batch of tasks from $p(\tau)$
4       foreach $\tau_i \in \mathcal{T}$ do
5           foreach $S_c \in D_{train}(\tau_i)$ do
6              $M_\theta^{(c)}(\cdot) \leftarrow M\left(\cdot\, ; G_\theta \circ F(S_c)\right)$
7           $L_l(\tau_i) \leftarrow 0$
8           $L_g(\tau_i) \leftarrow 0$
9           foreach $(\mathbf{x}_i, y_i) \in D_{test}(\tau_i)$ do
10              $L_l(\tau_i) \leftarrow L_l(\tau_i) - \log \sigma\left(M_\theta^{(y_i)} \circ F(\mathbf{x}_i)\right) -$
                   $\sum_{c \neq y_i} \log\left(1 - \sigma\left(M_\theta^{(c)} \circ F(\mathbf{x}_i)\right)\right)$
11              $L_g(\tau_i) \leftarrow L_g(\tau_i) - \log \dfrac{\exp\left(M_\theta^{(y_i)} \circ F(\mathbf{x}_i)\right)}{\sum_c \exp\left(M_\theta^{(c)} \circ F(\mathbf{s}_i)\right)}$
12           $L(\tau_i) \leftarrow \frac{1}{NC} L_l(\tau_i) + \frac{\lambda}{N} L_g(\tau_i)$
13       $\theta \leftarrow \theta - \alpha \nabla_\theta \left(\sum_{\tau_i \in \mathcal{T}} L(\tau_i)\right)$
14    return $\theta$

FIG. 6

| | 5-way 1-shot | 5-way 5-shot | 20-way 1-shot | 20-way 5-shot |
|---|---|---|---|---|
| Matching Networks [26] | 43.56 ± 0.84% | 55.31 ± 0.73% | 17.31 ± 0.22% | 22.69 ± 0.20% |
| Meta-LSTM [20] | 43.44 ± 0.77% | 60.60 ± 0.71% | 16.70 ± 0.23% | 26.06 ± 0.25% |
| MAML [5] | 48.70 ± 1.84% | 63.11 ± 0.92% | 16.49 ± 0.58% | 19.29 ± 0.29% |
| Meta-SGD [14] | 50.47 ± 1.87% | 64.03 ± 0.94% | 17.56 ± 0.64% | 28.92 ± 0.35% |
| Relation Network [25] | 50.44 ± 0.82% | 65.32 ± 0.70% | 19.47 ± 0.25% | 33.48 ± 0.24% |
| MM-Net [2] | 53.37 ± 0.48% | 66.97 ± 0.35% | - | - |
| SNAIL [17] | 55.71 ± 0.99% | 68.88 ± 0.92% | - | - |
| MetaMG, Ours | 53.78 ± 0.87% | 67.40 ± 0.68% | 23.98 ± 0.29% | 36.57 ± 0.29% |

FIG. 10

METHOD AND SYSTEM FOR IMAGE CLASSIFICATION

CROSS-REFERENCE TO RELATED APPLICATION

This application claims the benefit of priority of Singapore Patent Application No. 10201902708Y, filed 26 Mar. 2019, the content of which being hereby incorporated by reference in its entirety for all purposes.

TECHNICAL FIELD

The present invention generally relates to a method and a system for image classification.

BACKGROUND

In many applications such as, but not limited to, negative scene detection for brand protection, product recognition, visual inspection, robot vision, a lot of sample images are required in order to apply machine learning techniques. In particular, deep learning has achieved great success in supervised image classification. A general pipeline to train high capacity deep neural networks is to iteratively tune the network parameters on a large amount of labelled data using gradient-based approaches. However, deep neural networks (DNNs) trained through this pipeline may easily break down due to overfitting when encountering the situation where objects of new categories are required to be classified with very few training samples. For example, DNNs, although may achieve high accuracy for image classification, requires a lot of sample images for training the networks, and further requires retraining the networks using all images when new categories are added in. This poses challenges, for example, in the case when sample images for training the networks are limited. More particularly, there are challenges in applying standard DNNs for incremental learning with a few examples: (i) DNNs do not perform well when little training data is available; (ii) DNNs suffer from catastrophic forgetting when used for incremental class learning.

Intuitively, such a limitation of deep neural networks contradicts the fact that human learning is efficient and incremental. Human beings can apply the experience learned from the past to achieve fast generalization on new categories from very limited examples. Human can also accumulate new experience through learning without much forgetting. These abilities are imitated in machine learning and named as few-shot learning and incremental learning. Few-shot learning aims at learning to recognize visual categories using only a few labelled exemplars from each category. Specifically, an N-way K-shot learning task is framed as learning to discriminate N categories providing K training samples for each category. Such a task could be treated as an extreme case of training data shortage where transfer learning and regularization could face big challenges due to overfitting. Some approaches to solving few-shot image classification exploit the idea of meta learning or "learning to learn". Conventional few-shot learning methods that solve the few-shot image classification problem, for example, cast the problem under an image verification framework. These methods learn project functions for image embedding in the meta learning phase. In the meta testing phase, the training images and testing images are projected to the learned embedding space and classification is implemented either by image verification, i.e., comparing training and testing images in pairs, or by nearest neighbour classification. Some techniques extended the idea of image verification to a prototype matching by using the class centroids in the embedding space as the templates. In another technique, a relation network was designed as a non-linear comparator instead of fixed linear comparators to classify images in the embedding space. Such embedding and metric learning approaches do not require further fine-tuning in the meta testing phase and hence the performance of these methods relies on the assumption that the embedding learned across the meta training tasks is sufficiently discriminative for the new tasks.

Another group of methods apply meta-learning across the meta training tasks to learn an optimizer which can provide optimization strategies for a deep neural network to fine-tune without severe overfitting using very few training samples within a small number of gradient-descent updates. For example, the MAML provides an effective way to learn initial conditions through meta-learning. From the observation that stochastic gradient descent rule resembles the update of the cell state in LSTM, the idea of MAML has been extended by proposing a meta-learner LSTM to learn not only initial conditions, has been introduced, but also the learning rates and update directions of SGD. Meta-SGD is similar to MAML but can also learn learning rates and update directions. Compared with meta-learner LSTM, meta-SGD can achieve faster learning in the meta testing phase since only one iteration of fine-tuning is applied. However, for most optimizer learning methods, fine-tuning is required and therefore the computational complexity is generally higher than embedding and metric learning based approaches.

A need therefore exists to provide a method of image classification that seek to overcome, or at least ameliorate, one or more of the deficiencies in conventional image classification methods/systems, such as to improve accuracy and/or reliability. It is against this background that the present invention has been developed.

SUMMARY

According to a first aspect of the present invention, there is provided a method of image classification using at least one processor, the method comprising:
   providing a set of category mapping discriminators, each corresponding to a respective category, wherein each category mapping discriminator of the set of category mapping discriminators is configured for discriminating features relating to input images that belong to the respective category of the category mapping discriminator;
   extracting a plurality of features from an input image using a machine learning model;
   determining, for each of the set of category mapping discriminators, an output value based on the plurality of extracted features using the category mapping discriminator; and
   determining a classification of the input image based on the output values of the set of category mapping discriminators.

According to a second aspect of the present invention, there is provided a system for image classification, the system comprising:
   a memory; and
   at least one processor communicatively coupled to the memory and configured to:
      provide a set of category mapping discriminators, each corresponding to a respective category, wherein each category mapping discriminator of the set of category mapping discriminators is configured for discriminating features relating to input images that belong to the respective category of the category mapping discriminator;

extract a plurality of features from an input image using a machine learning model;

determine, for each of the set of category mapping discriminators, an output value based on the plurality of extracted features using the category mapping discriminator; and determine a classification of the input image based on the output values of the set of category mapping discriminators.

According to a third aspect of the present invention, there is provided a computer program product, embodied in one or more non-transitory computer-readable storage mediums, comprising instructions executable by at least one processor to perform a method of image classification, the method comprising:

providing a set of category mapping discriminators, each corresponding to a respective category, wherein each category mapping discriminator of the set of category mapping discriminators is configured for discriminating features relating to input images that belong to the respective category of the category mapping discriminator;

extracting a plurality of features from an input image using a machine learning model;

determining, for each of the set of category mapping discriminators, an output value based on the plurality of extracted features using the category mapping discriminator; and determining a classification of the input image based on the output values of the set of category mapping discriminators.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 3 depicts an example computer system which the system according to various embodiments of the present invention may be embodied in;

FIG. 6 illustrates an exemplary algorithm that summarizes the meta training procedure according to various example embodiments of the present invention;

FIG. 10 shows the average classification accuracy among compared methods on a miniImageNet dataset.

DETAILED DESCRIPTION

Figure 1:
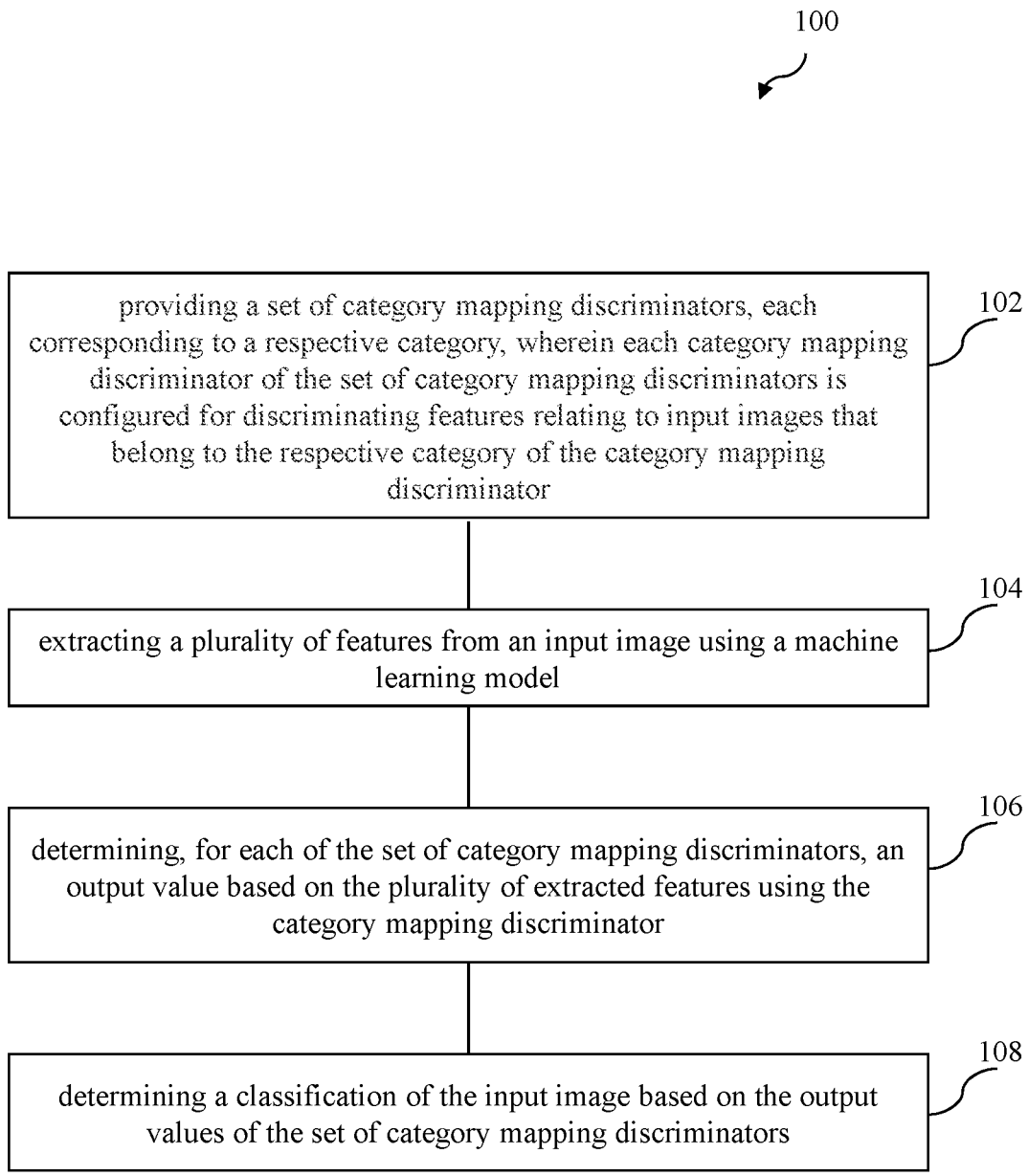
FIG. 1 depicts a schematic flow diagram of a method (computer-implemented method) for image classification using at least one processor according to various embodiments of the present invention.

Unlike the traditional supervised classification paradigm where training is conducted from a set of labelled exemplars, meta learning is conducted based on a set of tasks, each containing a training set and a testing set. In the context of supervised image classification, meta learning frames a learning process at two phases: meta training and meta testing. In the meta training phase, a meta-learner is trained by learning from a number of tasks from an auxiliary dataset to capture transferable knowledge across the tasks. Such knowledge could be image representations where the similarity between images can be measured through defined metrics or optimizers which can provide optimization strategies tailored to address the classification problem under the few-shot setting. After meta training, the meta-learner can be applied to address the targeting few shot classification problem by treating it as a new task and solving it using the generalized knowledge learned from auxiliary tasks in the meta training phase. Present meta learning methods (e.g., matching networks, relation networks, Meta SGD) can train a classifier with one or a few images but they do not address the incremental learning problem. When there are more categories in the classification task, these methods suffer low accuracy. Present incremental learning methods (e.g., iCaRL) require part of the sample images from the old dataset in order to remember the old categories. And the whole network has to be retrained with images from new categories. It is time consuming and computationally intensive. Images for old categories must be kept for the retraining of the network.

Various embodiments of the present invention provide a method (computer-implemented method) and a system (including a memory and at least one processor communicatively coupled to the memory) for image classification. In various embodiments, an image classification framework based on meta learning is provided to address the fast few-shot incremental learning problem. In various embodiments, the image classification framework may comprise a machine learning model (or feature extractor) for extracting features from an input image and a meta learning model (or module generator) for generating one or more category mapping discriminators (or meta modules) corresponding to one or more respective categories. The machine learning model, for example, may be a neural network. In various embodiments, one or more category mapping discriminators (or meta modules) may be rapidly generated from one or a few samples based on meta learning to recognize one or more respective categories. The machine learning model and category mapping discriminators may form a scalable classification network (or classifier) for image classification. Classification or recognition may be achieved by jointly adapting all the category mapping discriminators together to partition a feature space into different regions for different categories. Accordingly, the image classification framework may solve few-shot incremental learning using discriminative neural network structures and meta learning. For example, the image classification framework may solve the few-shot learning and incremental learning problem simultaneously, i.e., few-shot incremental learning.

FIG. 1 depicts a schematic flow diagram of a method 100 (computer-implemented method) for image classification using at least one processor according to various embodiments of the present invention. The method 100 comprises providing (at 102) a set of category mapping discriminators, each corresponding to a respective category, wherein each category mapping discriminator of the set of category mapping discriminators is configured for discriminating features relating to input images that belong to the respective category of the category mapping discriminator; extracting (at 104) a plurality of features from an input image using a machine learning model; determining (at 106), for each of the set of category mapping discriminators, an output value based on the plurality of extracted features using the category mapping discriminator; and determining (at 108) a classification of the input image based on the output values of the set of category mapping discriminators.

In relation to 102, in various embodiments, the set of category mapping discriminators are each configured to separate a feature space into different regions each associated to a respective category of a corresponding category mapping discriminator. Each category mapping discriminator may be configured to serve as a non-linear decision boundary that encloses a region belonging to the respective category of the category mapping discriminator in the feature space. For example, the category mapping discriminators may be (discriminative) non-linear decision boundaries that each encloses a region belonging to its respective category in the feature space. In various embodiments, each of the category mapping discriminators may be non-linear so as to separate features which are non-linear. The category mapping discriminators may use original features extracted from an input image and map the original features to their respective category. Accordingly, discriminative characteristics among image categories are not lost.

In various embodiments, each category mapping discriminator of the set of category mapping discriminators may be a binary classifier. In various embodiments, the set of category mapping discriminators each comprises a corresponding set of parameters configured for identifying features relating to input images that belong to the respective category of the category mapping discriminator. For example, the set of category mapping discriminators may each comprise a unique set of parameters configured for identifying features relating to input images that belong to the respective category of the category mapping discriminator. In various embodiments, a category mapping discriminator may be parameterized by weights w. For example, the set of category mapping discriminators may each comprise a unique set of weights. In this regard, each category mapping discriminator may be configured to generate a high output value based on features relating to input images that belong to a respective category corresponding to the category mapping discriminator and a low output value based on features relating to input images that does not belong to the respective category.

In various embodiments, the above-mentioned providing a set of category mapping discriminators may further comprise generating one or more new category mapping discriminators corresponding to one or more new categories, respectively. Each new category mapping discriminator of the one or more new category mapping discriminators may be configured for discriminating features relating to input images that belong to the respective new category of the new category mapping discriminator. In various embodiments, the one or more new category mapping discriminators may be incorporated into the set of category mapping discriminators to obtain an updated set of category mapping discriminators. The updated set of category mapping discriminators may each be configured for discriminating features relating to input images that belong to the respective category of the category mapping discriminator, including the new category.

In various embodiments, the above-mentioned generating one or more new category discriminators may be based on a meta learning model (or module generator network) using a training dataset in relation to the one or more new categories.

In various embodiments, a training dataset in relation to a new category may comprise one or a few training images (samples) in relation to a new category (e.g., in-category samples). For example, the parameters of a new category mapping discriminator corresponding to a respective new category may be generated by feedforwarding the training images in relation to the new category through the meta learning model in a training phase.

In various embodiments, the parameters of a category mapping discriminator corresponding to a respective category may be generated by feedforwarding training images (samples) through the meta learning model without requiring fine-tuning or parameter updates after the training phase (e.g., no fine-tuning is required in a testing phase). In other words, after the training phase, the meta learning model may output the parameters (e.g., output weights) for a category mapping discriminator by feedforwarding the training images once. The output weights may be directly exploited without further updates. Accordingly, a discriminative category mapping discriminator may be generated for each new category without re-training existing category mapping discriminators or storing previously learned categorical samples. For example, there is no need to store previous training samples or re-training the image classification framework, instead the category mapping discriminators with configured parameters are stored. Further, unlimited category learning may be advantageously achieved, i.e., lifelong learning.

In various embodiments, the training dataset comprises a set of tasks, each task comprising a training set and a testing set.

In various embodiments, the meta learning model correlates a plurality of sample features from the training dataset in relation to a new category and maps the plurality of sample features to parameters of a new category mapping discriminator. As described, a category mapping discriminator may be parameterized by weights w. Therefore, the architecture of the meta learning model may be strong in feature correlation in order to produce a highly relevant category mapping discriminator.

In various embodiments, the machine learning model comprises a neural network. For example, the neural network may be a convolutional neural network (CNN).

In relation to 106, in various embodiments, the plurality of features extracted from the input image may be provided to each category mapping discriminator. For example, the extracted features for each input image are outputs of non-linear activation function and accordingly the features may be non-linear. To classify images of different categories, the category mapping discriminators may be configured to be non-linear decision boundaries that each encloses a region belonging to its respective category in the feature space. In relation to 108, in various embodiments, the above-mentioned determining a classification for the input image based on the output values of the set of category mapping discriminators comprises determining a label associated to a category for the input image based on a corresponding category mapping discriminator having a highest output value among the set of category mapping discriminators.

The image classification framework provides a clean meta learning solution to generate new category mapping discriminators by feedforwarding the training images through the module generator without further weight updates. Accordingly, a fast and effective few-shot incremental learning is realized. It is also noted that the framework remains dynamically expanded as the discriminative knowledge of the new category is incorporated into the generated category mapping discriminator. Therefore, the framework may implement fast incremental learning without forgetting the learned knowledge. Also, no retraining or data storing for the learned categories is required, which keeps the framework under low computational and storage complexities.

Figure 2:
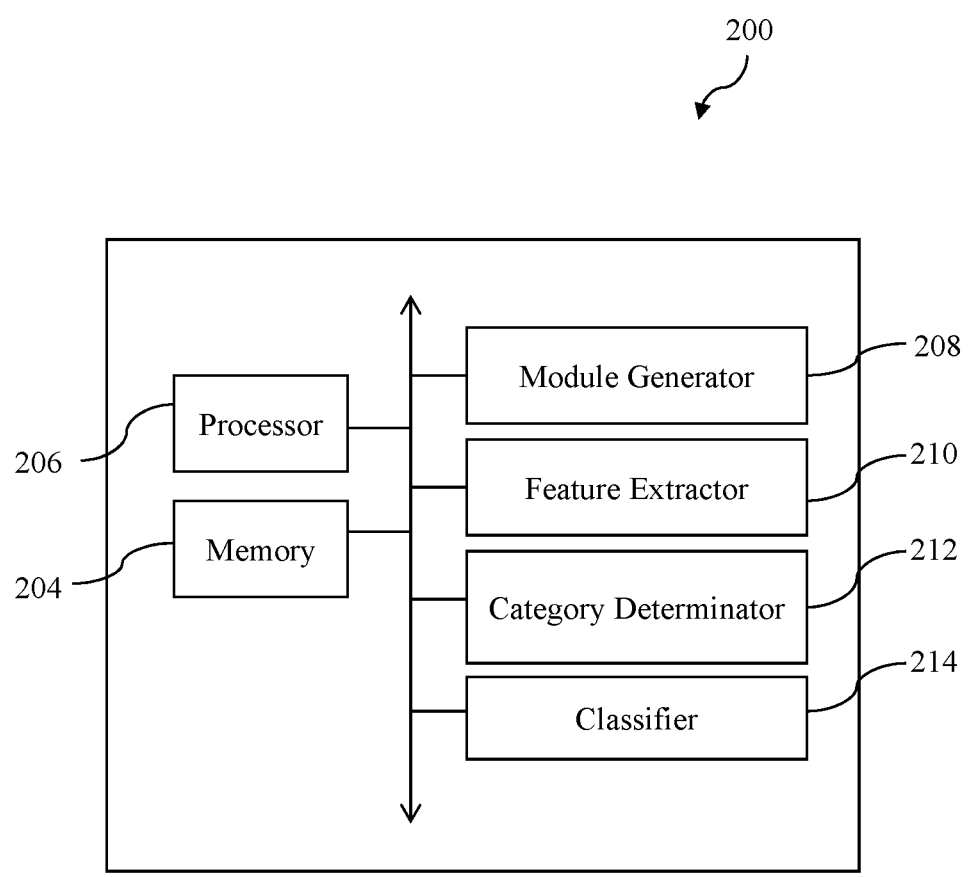
FIG. 2 depicts a schematic block diagram of a system for image classification according to various embodiments of the present invention.

FIG. 2 depicts a schematic block diagram of a system 200 for image classification according to various embodiments of the present invention, such as corresponding to the method 100 for image classification as described hereinbefore according to various embodiments of the present invention.

The system 200 comprises a memory 204, and at least one processor 206 communicatively coupled to the memory 204 and configured to: provide a set of category mapping discriminators, each corresponding to a respective category, wherein each category mapping discriminator of the set of category mapping discriminators is configured for discriminating features relating to input images that belong to the respective category of the category mapping discriminator; extract a plurality of features from an input image using a machine learning model; determine, for each of the set of category mapping discriminators, an output value based on the plurality of extracted features using the category mapping discriminator; and determine a classification of the input image based on the output values of the set of category mapping discriminators.

It will be appreciated by a person skilled in the art that the at least one processor 206 may be configured to perform the required functions or operations through set(s) of instructions (e.g., software modules) executable by the at least one processor 206 to perform the required functions or operations. Accordingly, as shown in FIG. 2, the system 200 may further comprise a module generator (or a module generating module or circuit) 208 configured to provide a set of category mapping discriminators, each corresponding to a respective category, wherein each category mapping discriminator of the set of category mapping discriminators is configured for discriminating features relating to input images that belong to the respective category of the category mapping discriminator; a feature extractor (or a feature extracting module or circuit) 210 configured to extract a plurality of features from an input image using a machine learning model; a category determinator (or category determining module or circuit) 212 configured to determine, for each of the set of category mapping discriminators, an output value based on the plurality of extracted features using the category mapping discriminator; and a classifier (classifying module or circuit) 214 configured to determine a classification of the input image based on the output values of the set of category mapping discriminators.

It will be appreciated by a person skilled in the art that the above-mentioned modules (or circuits) are not necessarily separate modules, and two or more modules may be realized by or implemented as one functional module (e.g., a circuit or a software program) as desired or as appropriate without deviating from the scope of the present invention. For example, the module generator 208, the feature extractor 210, the category determinator 212, and/or the classifier 214 may be realized (e.g., compiled together) as one executable software program (e.g., software application or simply referred to as an "app"), which for example may be stored in the memory 204 and executable by the at least one processor 206 to perform the functions/operations as described herein according to various embodiments.

In various embodiments, the system 200 corresponds to the method 100 as described hereinbefore with reference to FIG. 1, therefore, various functions/operations configured to be performed by the least one processor 206 may correspond to various steps or operations of the method 100 described hereinbefore according to various embodiments, and thus need not be repeated with respect to the system 200 for clarity and conciseness. In other words, various embodiments described herein in context of the methods are analogously valid for the respective systems (e.g., which may also be embodied as devices).

For example, in various embodiments, the memory 204 may have stored therein the module generator 208, the feature extractor 210, the category determinator 212, and/or the classifier 214, which respectively correspond to various steps or operations of the method 100 as described hereinbefore, which are executable by the at least one processor 206 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the system 200 described hereinbefore may include a processor (or controller) 206 and a computer-readable storage medium (or memory) 204 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "providing", "generating", "extracting", or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system (which may also be embodied as a device or an apparatus) for performing the operations/functions of the methods described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps or operations of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention. It will be appreciated by a person skilled in the art that various modules described herein (e.g., the module generator 208, the feature extractor 210, the category determinator 212, and/or the classifier 214) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps or operations of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general-purpose computer. The computer program when loaded and executed on such a general-purpose computer effectively results in an apparatus that implements the steps or operations of the methods described herein.

In various embodiments, there is provided a computer program product, embodied in one or more computer-readable storage mediums (non-transitory computer-readable storage medium), comprising instructions (e.g., the module generator 208, the feature extractor 210, the category determinator 212, and/or the classifier 214) executable by one or more computer processors to perform a method 100 for image classification as described hereinbefore with reference to FIG. 1. Accordingly, various computer programs or modules described herein may be stored in a computer program product receivable by a system (e.g., a computer system or an electronic device) therein, such as the system 200 as shown in FIG. 2, for execution by at least one processor 206 of the system 200 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 3:
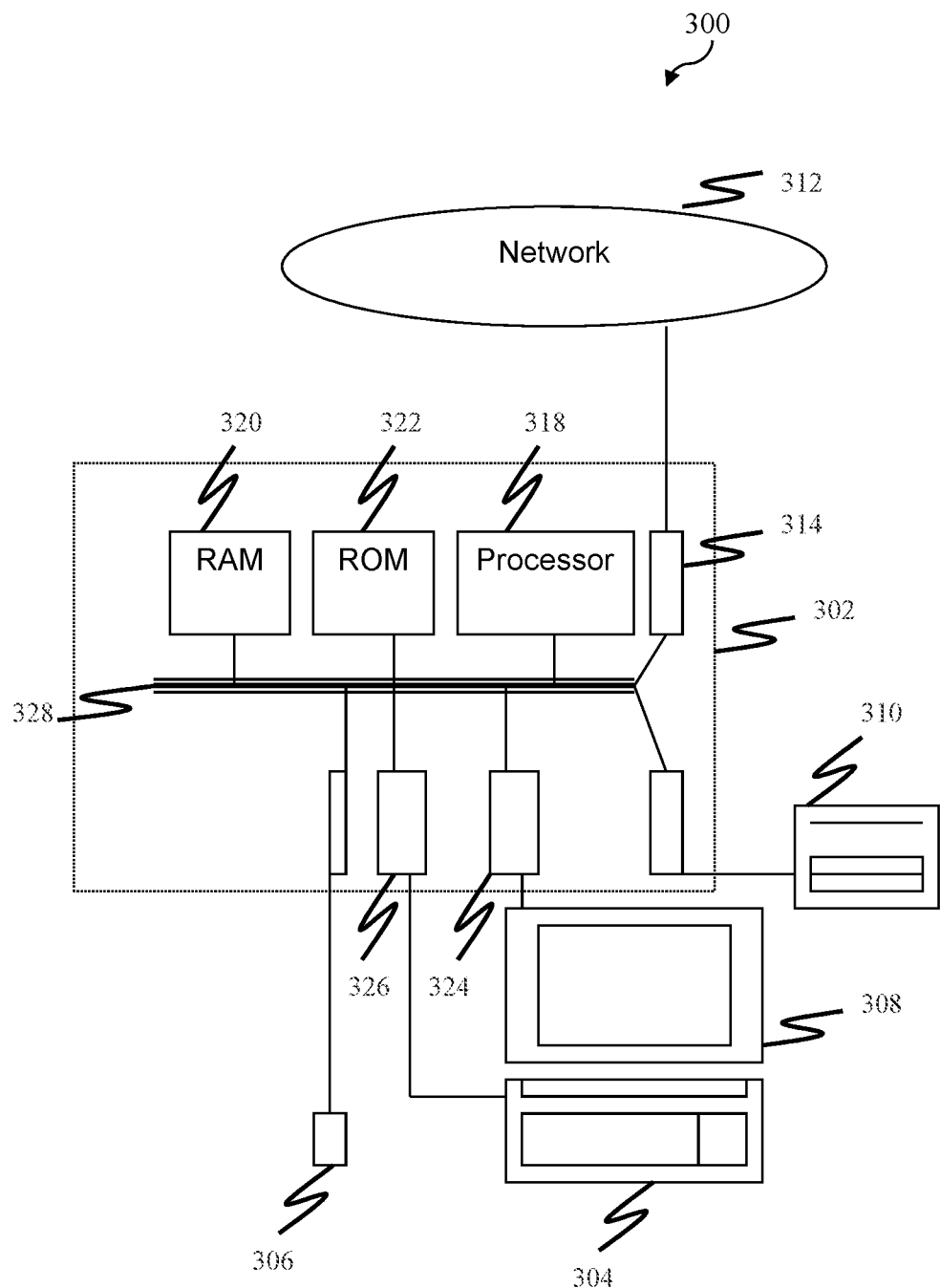

In various embodiments, the above-mentioned computer system may be realized by any computer system (e.g., portable or desktop computer system), such as a computer system 300 as schematically shown in FIG. 3 as an example only and without limitation. Various methods/operations or functional modules (e.g., the module generator 208, the feature extractor 210, the category determinator 212, and/or the classifier 214) may be implemented as software, such as a computer program being executed within the computer system 300, and instructing the computer system 300 (in particular, one or more processors therein) to conduct the methods/functions of various embodiments described herein. The computer system 300 may comprise a computer module 302, input modules, such as a keyboard 304 and a mouse 306, and a plurality of output devices such as a display 308, and a printer 310. The computer module 302 may be connected to a computer network 312 via a suitable transceiver device 314, to enable access to e.g. the Internet or other network systems such as Local Area Network (LAN) or Wide Area Network (WAN). The computer module 302 in the example may include a processor 318 for executing various instructions, a Random Access Memory (RAM) 320 and a Read Only Memory (ROM) 322. The computer module 302 may also include a number of Input/Output (I/O) interfaces, for example I/O interface 324 to the display 308, and I/O interface 326 to the keyboard 304. The components of the computer module 302 typically communicate via an interconnected bus 328 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising", or the like such as "includes" and/or "including", when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Figure 4:
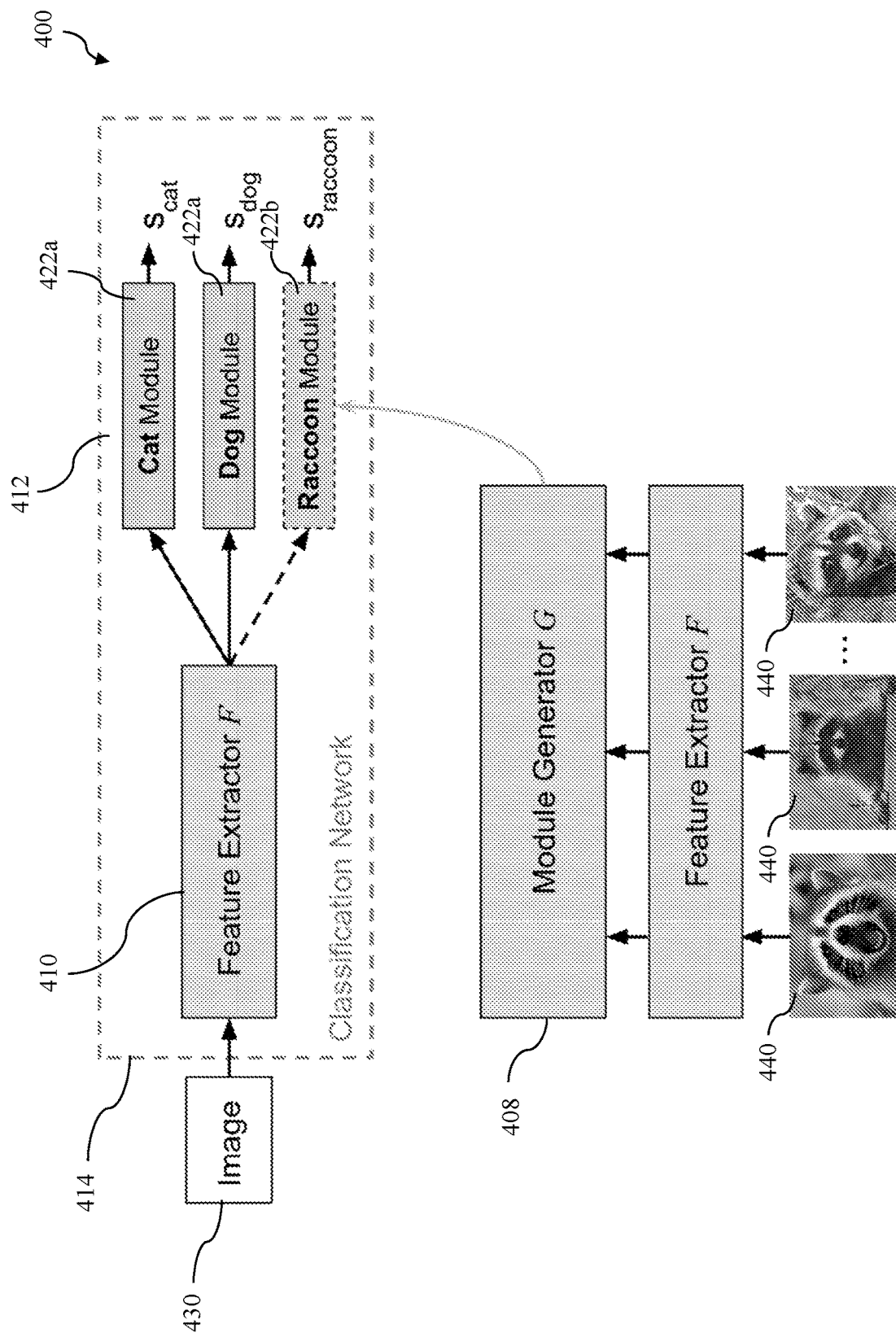
FIG. 4 illustrates a diagram of an exemplary image classification framework according to various example embodiments of the present invention.

Various example embodiments of the present invention describes an image classification framework based on meta learning. In various example embodiments, the image classification framework employs a meta learning model which allows for fast few-shot incremental learning. FIG. 4 illustrates a diagram of an exemplary image classification framework 400 according to various example embodiments of the present invention. In various example embodiments, the image classification framework 400 may include a module generator 408, a feature extractor 410 and a category determinator 412.

In various example embodiments, the feature extractor 410 and the category determinator 412 may form a scalable classification network or classifier 414 component of the image classification framework 400. In various example embodiments, the feature extractor 410 may be a neural network, such as but not limited to, a convolutional neural network (CNN). The feature extractor 410 may serve to produce discriminative features for image samples (input images). In various example embodiments, the feature extractor 410 may be an abstract module which may be any convolutional neural network (e.g., ResNet152, ResNet101, PolyNet, VGG16, simple CNN with four convolution modules, etc.), either trained from the auxiliary dataset on hand or pre-trained on any large dataset such as ImageNet. In various example embodiments, the neural network may be without the last classification layer and output activations of the second last layer of the original network may be employed as features. As an example illustration, the Resnet152 network comprises 2048 output activations in second last layer and these are used as feature parameters.

The category determinator 412 may be used to predict the category for an input image. In various example embodiments, the category determinator 412 may include a set of category mapping discriminators 422. For example, the classifier 414 may be a cascade of a feature extractor and a set of category mapping discriminators. In various example embodiments, each category mapping discriminator 422 of the set of category mapping discriminators 422 may each correspond to a respective category. In other words, one category mapping discriminator may correspond to one category. Each category mapping discriminator 422 may be used to discriminate samples in its respective category and samples that do not belong to its respective category. For example, each category mapping discriminator 422 of the set of category mapping discriminators 422 may serve to support image samples relating to its respective category by outputting scores higher than those produced by the other category mapping discriminators. In various example embodiments, the same set of features extracted from an input image by the feature extractor 410 may be provided to each category mapping discriminator 422. For example, in the case Resnet152 is employed as the feature extractor, 2048 features may be extracted from each image and these 2048 features may be provided to each category mapping discriminator 422 of the category determinator 412. Given a test image or input image 430 being feedforwarded through the classifier 414, the category mapping discriminator 422 that outputs the highest score indicates the predicted category of the input image.

In various example embodiments, each category mapping discriminator 422 of the set of category mapping discriminators 422 may non-linearly enclose a region in a feature space. For example, the extracted features for each input image are outputs of non-linear activation function and accordingly the features may be non-linear. Hence, to classify images of different categories, the category mapping discriminators may be configured to be non-linear decision boundaries that each encloses a region belonging to its respective category in the feature space.

In various example embodiments, the category mapping discriminators 422 in the category determinator 412 may be lightweight category mapping discriminators to ensure that the size of classification network is endurable after a large amount of category mapping discriminators are added into the set of category mapping discriminators. For example, the category mapping discriminators 422 may be lightweight as each category mapping discriminator requires much less parameters compared to large deep neural network which needs large amount of memory for storage. The category mapping discriminators may be configured with much less numbers of parameters, accordingly, requires very little memory for storage.

According to various embodiments of the present invention, the classification network or classifier 414 may be dynamically expanded by adding category mapping discriminators corresponding to new categories to the set of category mapping discriminators 422 in the category determinator 412. In other words, the category determinator 412 may be scalable by adding in more and more category mapping discriminators. For example, as illustrated in FIG. 4, a set of category mapping discriminators may comprise a first category mapping discriminator 422a (e.g., cat module) corresponding to a first category (e.g., cat) and a second category mapping discriminator 422a (e.g., dog module) corresponding to a second category (e.g., dog). A new category mapping discriminator 422b (e.g., raccoon module) corresponding to a new respective category (e.g., raccoon) may be added to the set of category mapping discriminators comprising the first category mapping discriminator 422a and the second category mapping discriminator 422a to obtain an updated set of category mapping discriminators.

As will be appreciated by person skilled in the art, incremental learning may be conducted as a type of human-like learning to acquire new knowledge while retaining the existing knowledge. Conventional approaches on incremental learning are proposed to address the catastrophic forgetting problem of CNNs, i.e., training from class-incremental examples may cause the classification performance to quickly and severely deteriorate for those previously learned classes. To alleviate the problem, a group of approaches selectively store a subset of the previous training data to represent the learned classes. For example, one approach stores a subset of previous training samples which can best represent the corresponding category and trains a class-incremental learner based on nearest neighbor classification. To address the catastrophic forgetting problem, the approach tunes the network parameters by minimizing the cost function including a distillation term to make the predictions on the learned classes invariant. Compared with conventional methods targeting on incremental learning using a large number of labelled data, various embodiments of the present invention focus on addressing novel class (or category) incremental learning from very few labelled data. Various embodiments of the present invention may generate a discriminative category mapping discriminator for each novel category without retraining or storing previously learned categorical samples, which may achieve unlimited category learning, i.e., lifelong learning.

In various example embodiments, a category mapping discriminator 422 may be a spherical category mapping discriminator. For example, a hypersphere may be used as the category mapping discriminator to approximately enclose a category region. In this way, a category mapping discriminator may hold a centroid vector m and a radius r. Given a feature point p, a spherical mapping discriminator may compute $$r - \sqrt{(p-m)^T(p-m)}$$

where T denotes vector transpose. For example vectors are all column vectors by default, therefore, to make an inner product of two column vectors, the first one should be transposed.

In various example embodiments, a category mapping discriminator 422 may be a Multi-Gaussian category mapping discriminator. For example, category mapping discriminator may be designed under a natural assumption that feature points of a category follow a multivariate Gaussian distribution. In this way, a category mapping discriminator may hold a mean vector μ and a covariance matrix Σ. The Mahalanobis distance may be used to restrict the corresponding feature points to be within three standard deviations from the mean. Given a feature point p, a Multi-Gaussian category mapping discriminator may compute $$3 - \sqrt{(p-\mu)^T \Sigma^{-1}(p-\mu)}$$

A problem to this design is that the covariance matrix has too many parameters which not only make the mapping discriminator heavy but also introduce difficulty to the optimization process. To alleviate this problem, $\Sigma = \text{diag}(\sigma_1^2, \ldots, \sigma_d^2)$ may be used to approximate the distribution.

In various example embodiments, a category mapping discriminator 422 may be a multi-layer perceptron (MLP) category mapping discriminator. The category mapping discriminator may be defined as a multi-layer perceptron without imposing any assumption on the distribution of feature points. In various example embodiments, the category mapping discriminator may comprise a linear layer with sixteen units, followed by a ReLU activation and a linear layer with one unit.

As for the module generator 408, it may generate category mapping discriminators, each corresponding to a respective category, which may be incorporated or plugged into the classification network or classifier 414 to recognize their corresponding categories. In various example embodiments, the module generator 408 may rapidly generate a category mapping discriminator from one or a few samples (e.g., few-shot image classification). As illustrated in FIG. 4, two category mapping discriminators 422a for categories cat and dog have been generated and provided in the classifier 414. Given a few training samples 440 from a new category raccoon, a category mapping discriminator 422b corresponding to category raccoon may be generated by feedforwarding the samples through the module generator 408. The new category mapping discriminator 422b (e.g., raccoon module) corresponding to the new category (e.g., raccoon) may be incorporated or plugged into the scalable classification network or classifier 414 and accordingly, the updated classification network may recognize the new category (e.g., raccoon category).

In various example embodiments, a discriminative category mapping discriminator corresponding to a category may be generated by feeding one or few training samples through the module generator 408 and training the module generator 408 based on meta learning on auxiliary tasks (or auxiliary meta learning dataset). The module generator 408 may correlate the features of category samples. In various example embodiments, the module generator 408 may generate a new category mapping discriminator using one or a few samples relating to a new category to discriminate this new category from all other categories.

In various example embodiments, the module generator 408 may be a meta learning model. In various example embodiments, the module generator 408 may be a function $G: R^{K \times d} \rightarrow R^p$ that maps features $\{f_1, \ldots, f_K\}$ of category samples to the weights w of a category mapping discriminator. Therefore, the architecture of the module generator 408 may be strong in feature correlation in order to produce a highly relevant category mapping discriminator.

The module generator 408 may be configured to generate a category mapping discriminator which outputs high scores for in-category samples and low scores for out-category samples.

Figure 5:
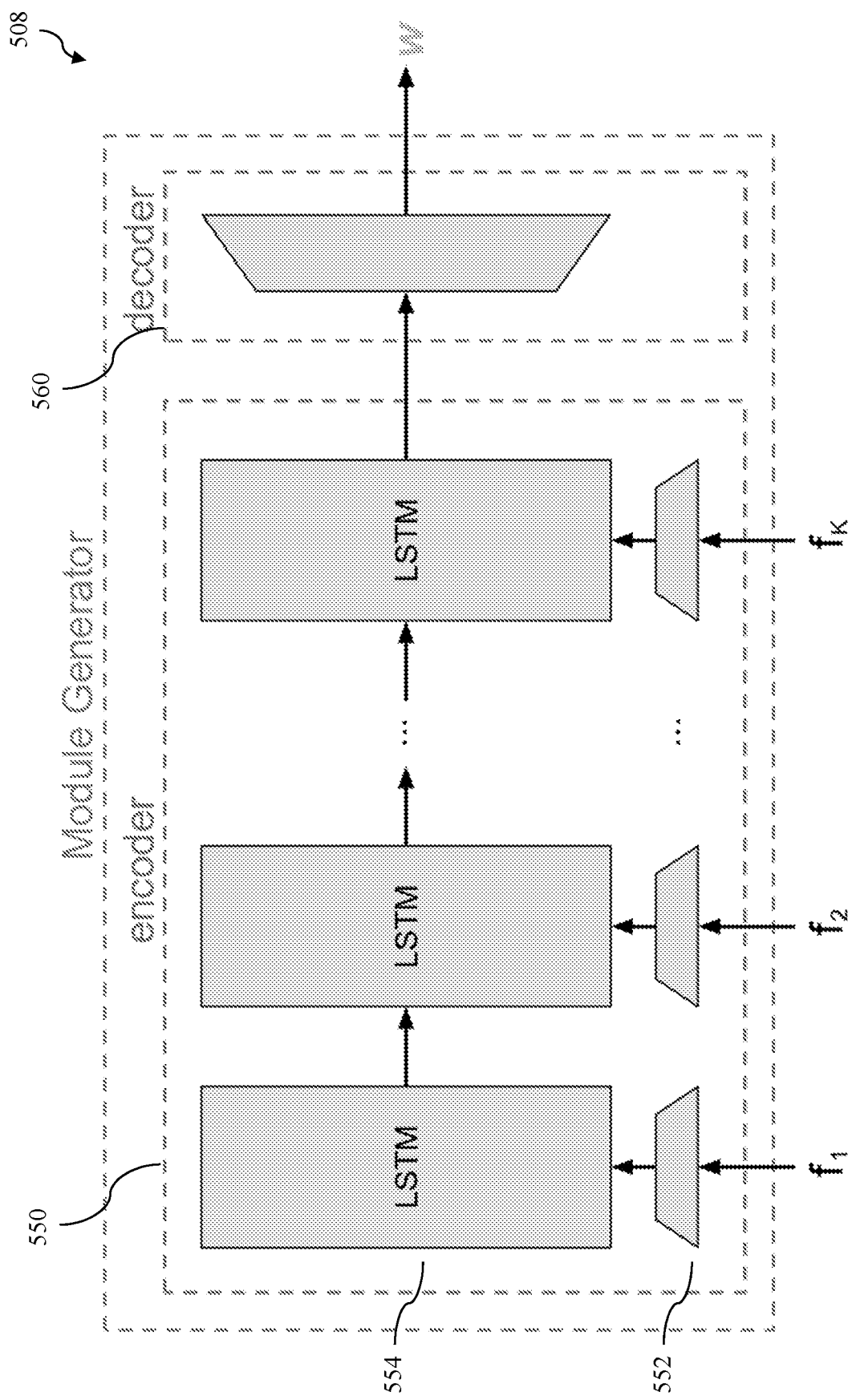
FIG. 5 shows an exemplary architecture of the module generator according to various example embodiments of the present invention.

In various example embodiments, the module generator 408 may be a LSTM-based module generator. For example, a LSTM network may be a powerful tool for feature correlation. FIG. 5 shows an exemplary architecture of the module generator 508 according to various example embodiments of the present invention. The module generator 508 may comprise an LSTM network using an encoder-decoder structure, as illustrated in FIG. 5. In various example embodiments, the encoder component 550 may be responsible for feature correlation. The encoder component 550 may comprise a linear layer 552 (e.g., with two hundred and fixty six units) for dimensionality reduction, followed by an LSTM network 554 (with five hundred and twelve hidden units). For example, the linear layer 552 may embed the features extracted from samples to a lower dimensional space, and the LSTM network may correlate the sample features together.

The decoder component 560 may be a single linear layer which is responsible for mapping the correlated features to the parameters (or parameter space) of a category mapping discriminator to be incorporated in the category determinator 412.

Returning to FIG. 4, in various example embodiments, the module generator 408 may be a DeepSets-based module generator. The module generator 408 may be viewed as a function that maps a set of sample features to a vector about the parameters of a category mapping discriminator. Thus, architectures that deal with set operations may be adopted. DeepSets has been proven to be capable to represent any permutation-invariant function that deals with set operations. The generated category mapping discriminators may be plugged into the classification network one by one. This enables incremental class learning without retraining of the whole neural network. Also, the samples from the existing categories need not be stored.

In various example embodiments, the ability of the module generator 408 to generate a discriminative category mapping discriminator by feeding a few training samples is learned through meta learning on auxiliary tasks. The details of the meta learning process is described as follows.

Meta-Sets

For meta learning datasets, the method may use a meta training set $\mathcal{D}_{meta-train}$ a meta validation set $\mathcal{D}_{meta-val}$ and a meta testing set $\mathcal{D}_{meta-test}$. The meta training set $\mathcal{D}_{meta-train}$ may be used to build meta training tasks to train the module generator 408. The meta validation set $\mathcal{D}_{meta-val}$ may be used to monitor the training performance and select the best parameters of the module generator 408. The meta testing set $\mathcal{D}_{meta-test}$ may be used to evaluate the classification performance. In various example embodiments, the meta training set $\mathcal{D}_{meta-train}$ may be used for training both the feature extractor and meta training the module generator. In other embodiments, the meta training set $\mathcal{D}_{meta-train}$ may be used for training the module generator, while the feature extractor may be trained using a different dataset. For example, the feature extractor may be pre-trained using a dataset, such as ImageNet in a non-limiting example, and the meta training set $\mathcal{D}_{meta-train}$ may be used to train the module generator, which may provide a better performance for the image classification framework.

Task

A task $\tau$ may be defined over a meta-set. In various example embodiments, a task $\tau$ may be defined over the meta training set $\mathcal{D}_{meta-train}$. The defined task $\tau$ may comprise of a training set $D_{train}(\tau)$ and a testing set $D_{test}(\tau)$. For example, a task $\tau$ may be defined as a unit comprising a pair of data sets, i.e., the training set and the testing set. The training set $D_{train}(\tau)$ may comprise support sets of randomly chosen categories which serve as inputs for the module generator 408 to generate category mapping discriminators. The testing set $D_{test}(\tau)$ may comprise multiple randomly chosen sample-label pairs (sample, label) which may be used to evaluate the discriminative performance of generated category mapping discriminators. For a task in the meta-training phase, the loss may be calculated on the testing set $D_{test}(\tau)$ and may be backpropagated to update the parameters of the module generator 408. In various example embodiments, different tasks may be built by randomly drawing samples for the training set $D_{train}(\tau)$ and the testing $D_{test}(\tau)$. All the possible tasks may form a task space which distribution may be defined as $p(\tau)$.

The image classification framework 400 aims at building a module generator 408 with the ability to generate from a few samples, a category mapping discriminator corresponding to a category that may enclose a region associated or belonging to the category in the feature space. To achieve the goal, a meta training task $\tau$ may be defined as follows. A meta training task $\tau$ may correspond to C randomly chosen categories. Its training set $D_{train}(\tau)$ may be a set of support sets for each category as follows:

$$D_{train}(\tau)=\{S_1, \ldots S_c, \ldots, S_C\}$$

where c denotes a category, c=1 to C, and each support set $S_c$ may comprise K category samples.

The testing set $D_{test}(\tau)$, on the other hand, may be a set of sample-label pairs (sample, label) as follows:

$$D_{test}(\tau)=\{(x_1,y_1), \ldots, (x_N,y_N)\}$$

with each category having T=N/C samples, where N denotes the number of samples in the testing set $D_{test}(\tau)$.

A category mapping discriminator may be a function $M(\bullet; w)$ parameterized by the weights w which may be generated by feeding the features of a support set through the module generator parameterized by $\theta$, $G_\theta$. For simplicity, the generated category mapping discriminator of the c-th category may be denoted as follows:

$$M_\theta^{(c)}(\bullet)=M(\bullet;G_\theta \bullet F(S_c)).$$

The loss function on the testing set $D_{test}(\tau)$ may be defined as follows. Locally, for each category mapping discriminator, it is configured to produce high scores for samples in its category and low scores for those out of its category. A local loss function may be defined as follows:

$$L_l(\tau, \theta) = -\frac{1}{NC}\sum_{c=1}^{C}\left[\sum_{\substack{(x_i,y_i) \\ y_i=c}} \log \sigma(M_\theta^{(c)} \circ F(x_i)) + \sum_{\substack{(x_i,y_i) \\ y_i \neq c}} \log(1 - \sigma(M_\theta^{(c)} \circ F(x_i)))\right],$$

The local loss function may be simplified as follows (e.g., simplified local loss function):

$$L_l(\tau, \theta) = -\frac{1}{NC}\sum_{(x_i,y_i)}\left[\log \sigma(M_\theta^{(y_i)} \circ F(x_i)) + \sum_{c \neq y_i}\log(1 - \sigma(M_\theta^{(c)} \circ F(x_i)))\right]$$

where $\sigma(\bullet)$ is the sigmoid function.

Globally, among all the generated category mapping discriminators, the score of a sample produced by its corresponding category mapping discriminator may be configured to be higher than the scores produced by other category mapping discriminators, which would provide an overview of the joint classification by a set of category mapping discriminators. A global loss function may be defined as follows:

$$L_g(\tau, \theta) = -\frac{1}{N}\sum_{(x_i,y_i)} \log \frac{\exp(M_\theta^{(y_i)} \circ F(x_i))}{\sum_c \exp(M_\theta^{(c)} \circ F(s_i))}$$

For example, the local loss may be similar to a one-vs-the-rest strategy for multi-class classification, while global loss may be similar to the one-vs-one strategy for multi-class classification. In various example embodiments, the linear combination of both losses may be used as the total loss.

In various example embodiments, an objective is to find $\theta$ that minimizes the expectation of the combined loss over the task space. The $\theta$ that minimizes the expectation of the combined loss over the task space may be determined as follows:

$$\mathbb{E}_{\tau \sim p(\tau)}[l(\tau,\theta)] = \mathbb{E}_{\tau \sim p(\tau)}[L_l(\tau,\theta) + \lambda L_g(\tau,\theta)]$$

During the meta training phase, the module generator may be optimized by minimizing the total loss. After the meta training process, the module generator gains the capability to generate new (incrementally) category mapping discriminators using a few image samples. FIG. 6 illustrates an exemplary algorithm 600 that summarizes the meta training procedure according to various example embodiments of the present invention. As illustrated in algorithm 600, line 3 samples a batch of tasks as defined in the aforementioned paragraphs. Lines 5-6 generate C category mapping discriminators from the support sets in the training set $D_{train}(\tau_i)$. Lines 7-12 compute the combined loss on samples in the testing task set $D_{test}(\tau_i)$. Finally, Line 13 updates the parameters θ via gradient descent through the total loss of all the tasks.

For category mapping discriminator generation, the parameters of a mapping discriminator may be generated by simply feedforwarding the training samples through the module generator without fine-tuning. Through meta training, the proposed module generator may be capable of generating discriminative category mapping discriminators using very few in-category examples. Instead of learning discriminative embeddings, the present framework focuses on generating discriminative non-linear decision boundaries.

Compared to conventional feature embedding and metric learning approach which compares image samples in embedded feature space, the image classification framework according to various embodiments of the present invention generates discriminative non-linear decision boundaries that maps the original features to their respective category. The disadvantage of the feature embedding of the conventional approach is the loss of information during the embedding process. In contrast, in the image classification framework according to various embodiments of the present invention, original features are used to map to the category mapping discriminators and hence, discriminative characteristics among image categories are not lost.

Compared with optimizer learning methods, various embodiments of the present invention leverages meta learning to output module generator parameters which can be used in the meta testing phase. Unlike conventional optimizer learning approaches which learn for the optimization conditions that can be used for weights update in the meta-testing phase, the module generator according to various embodiments of the present invention directly learns to output the weights of the category mapping discriminator and therefore no further fine-tuning is required in the meta testing phase.

Figure 7:
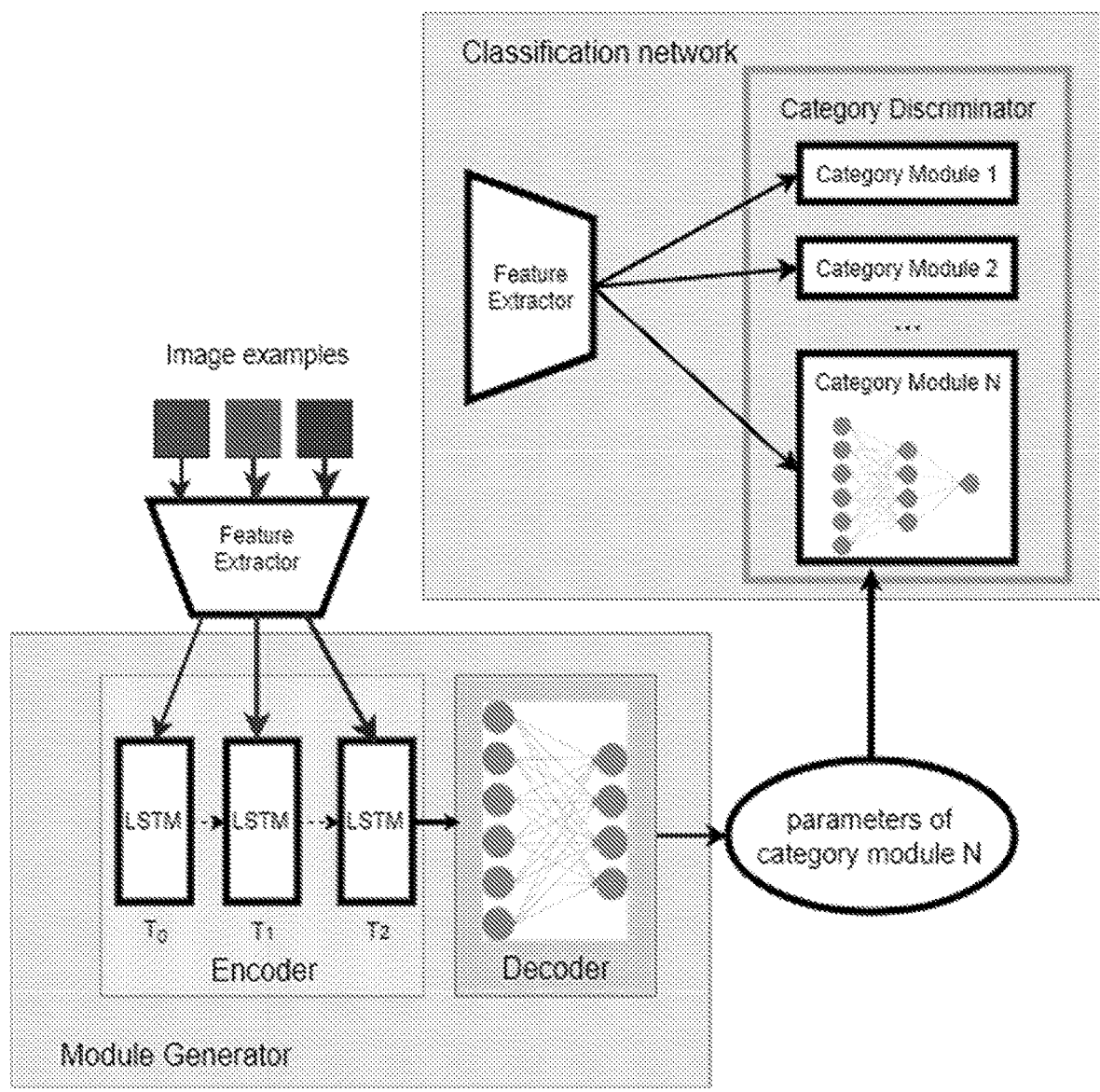
FIG. 7 illustrates a more detailed diagram of an exemplary image classification framework according to various example embodiments of the present invention.

FIG. 7 illustrates a more detailed diagram of an exemplary image classification framework 700 according to various example embodiments of the present invention. The category mapping discriminators may be non-linear in order to separate the extracted features of the input image. The category mapping discriminators may be configured to establish non-linear decision boundaries to discriminate different image categories since the features extracted from images are non-linear which are used for training in generating category mapping discriminators.

In various example embodiments, the best settings for the image classification framework may be determined and the image classification framework may be evaluated on few-shot incremental class learning on four image datasets in the following paragraphs. Moreover, the image classification framework according to various embodiments of the present invention is compared against several state-of-the-art methods on a miniImageNet dataset for the N-way K-shot classification problem. The efficiency of the image classification framework according to various embodiments of the present invention is also studied using, for example, a CPU or a GPU device.

An ablation study was conducted to explore the best settings for the image classification framework. The settings include category mapping discriminators, module generators, and the number C of support sets in a meta training task.

Dataset

In various example embodiments, the study was evaluated on a CUB200-2011 dataset comprising 200 bird categories with each category having about sixty images. The dataset was randomly split into 80, 20, and 100 categories as the meta training set, meta validation set, and meta testing set, respectively.

Feature Extractor

In various example embodiments, a ResNet101 model pre-trained on ImageNet was used as the feature extractor (machine learning model) throughout the ablation study. The weights of the model was fixed during the meta training process.

Meta-Training Hyperparameters

The number K of samples in a support set was set to be one and five for the 1-shot and 5-shot experiments, respectively. For ease of illustration and purpose of discussion, the number of samples for each category, T in the testing set was fixed to be 15 (i.e., T=15). In the case of C categories, there are altogether 15C testing samples within one task. For example, the N number of samples in the testing set of a task was fixed to be 15C, where N denotes the total number of samples for all categories in a task. In various example embodiments, the number of tasks in a batch was set to be thirty two. λ=1.0 was set empirically in the objective function. Each model was trained 1,000 iterations, and the one with the best validation accuracy was chosen.

Evaluation Protocol

During the meta testing phase, the experimental protocol in iCaRL for incremental class learning was followed. A category mapping discriminator was incrementally added for a novel category based on its support set with K random training samples, and 15 testing samples was randomly selected per category to measure the accuracy. After all the categories were added, the accuracy per number of categories was calculated. To obtain stable accuracy, 20,000 iterations of incremental evaluation was conducted and the average accuracy was calculated. Moreover, since the meta training tasks are sampled randomly, even for a fixed set of parameters, different best trained models result in different accuracy during evaluation. To obtain more statistically meaningful results, for each set of parameters, 10 models was trained and their evaluation accuracy were averaged to obtain a stabilized accuracy.

Category Mapping Discriminator

Figure 8A:
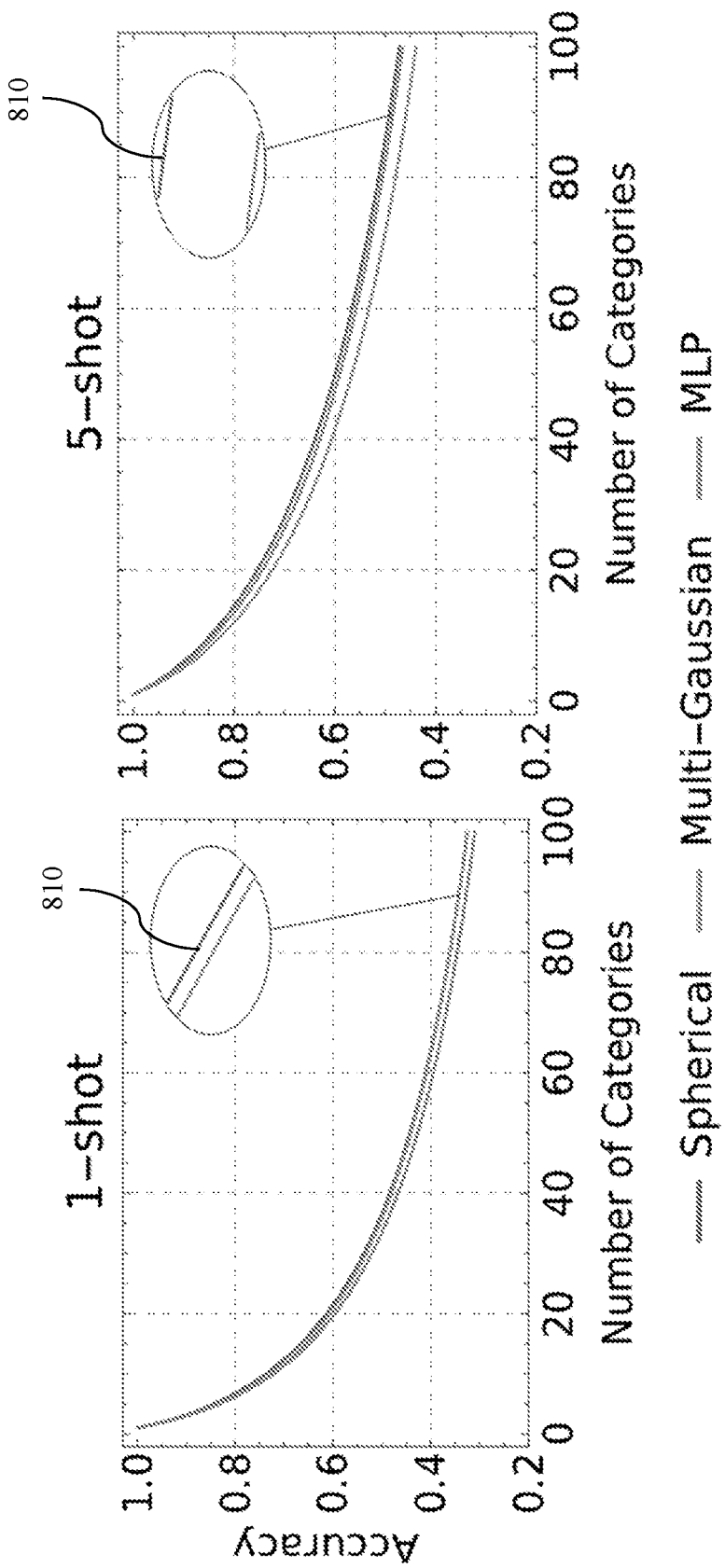
FIG. 8A illustrates the accuracy with respect to the number of categories given different types of category mapping discriminators.

FIG. 8A illustrates the accuracy with respect to the number of categories given different types of category mapping discriminators. In the 1-shot setting, the spherical mapping discriminator 810 performs slightly better than the other types of mapping discriminators at the beginning, and yields similar accuracy as that of Multi-Gaussian mapping discriminator at the end. In the 5-shot setting, the spherical mapping discriminator 810 performs generally better than the other two types of mapping discriminators. It is believed that this may be due to the spherical category mapping discriminator having fewer parameters which are easier to generate. As the spherical mapping discriminator performs slightly better and is lighter, it is used in the following experiments.

Module Generator

Figure 8B:
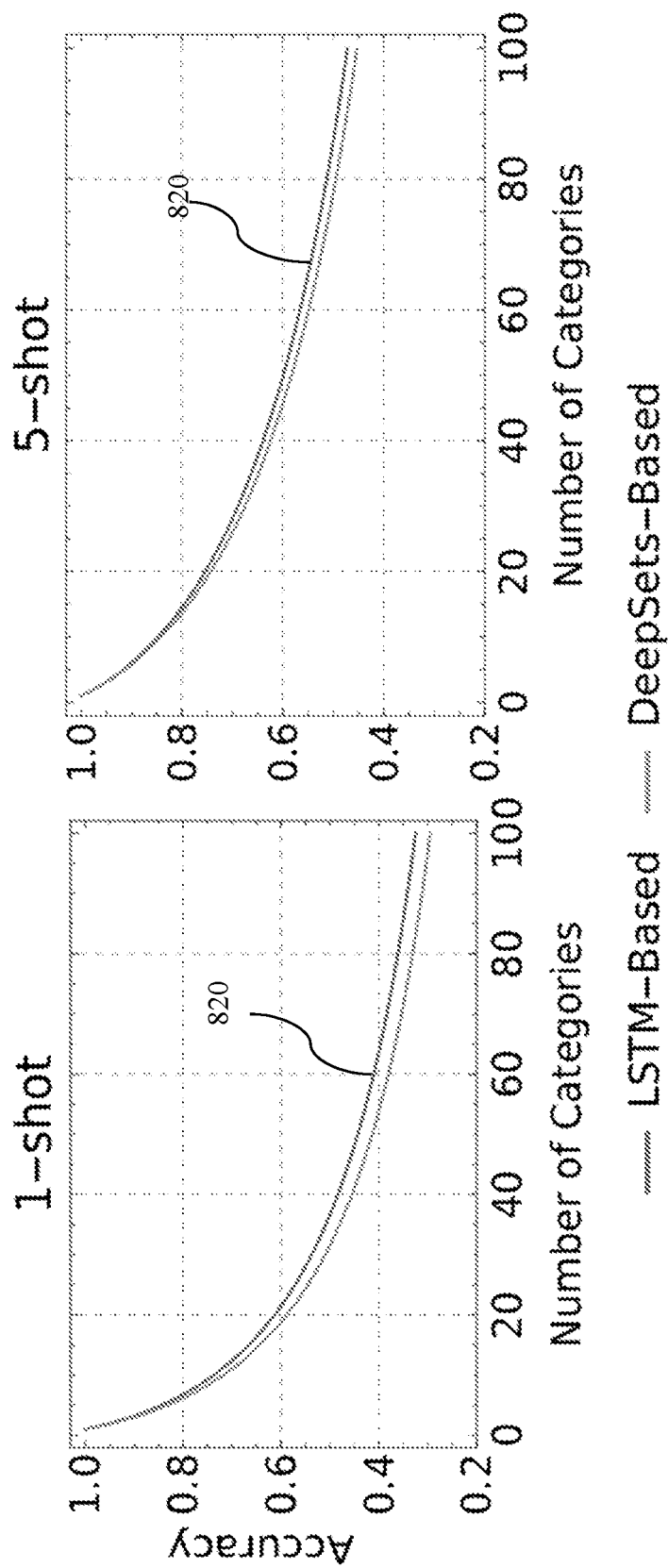
FIG. 8B illustrates the accuracy with different types of module generators.

FIG. 8B illustrates the accuracy with different types of module generators. In both cases, i.e., in the 1-shot setting and in the 5-shot setting, the LSTM-based module generator

820 performs better than the DeepSets-based one. This suggests that the LSTM-based module generator may better correlate the features of samples in a support set. On one hand, human learns a new concept by seeing examples (samples) one after another, and the LSTM-based module generator imitates this behaviour. On the other hand, for the LSTM-based module generator, a task would become a new task by simply changing the sequence order of the samples in a support set (in the training set for one task), which to some degree provides more training data than the DeepSets-based module generator. Therefore, the LSTM-based module generator is choosen in the following experiments.

Number C of Support Sets in a Task

Figure 8C:
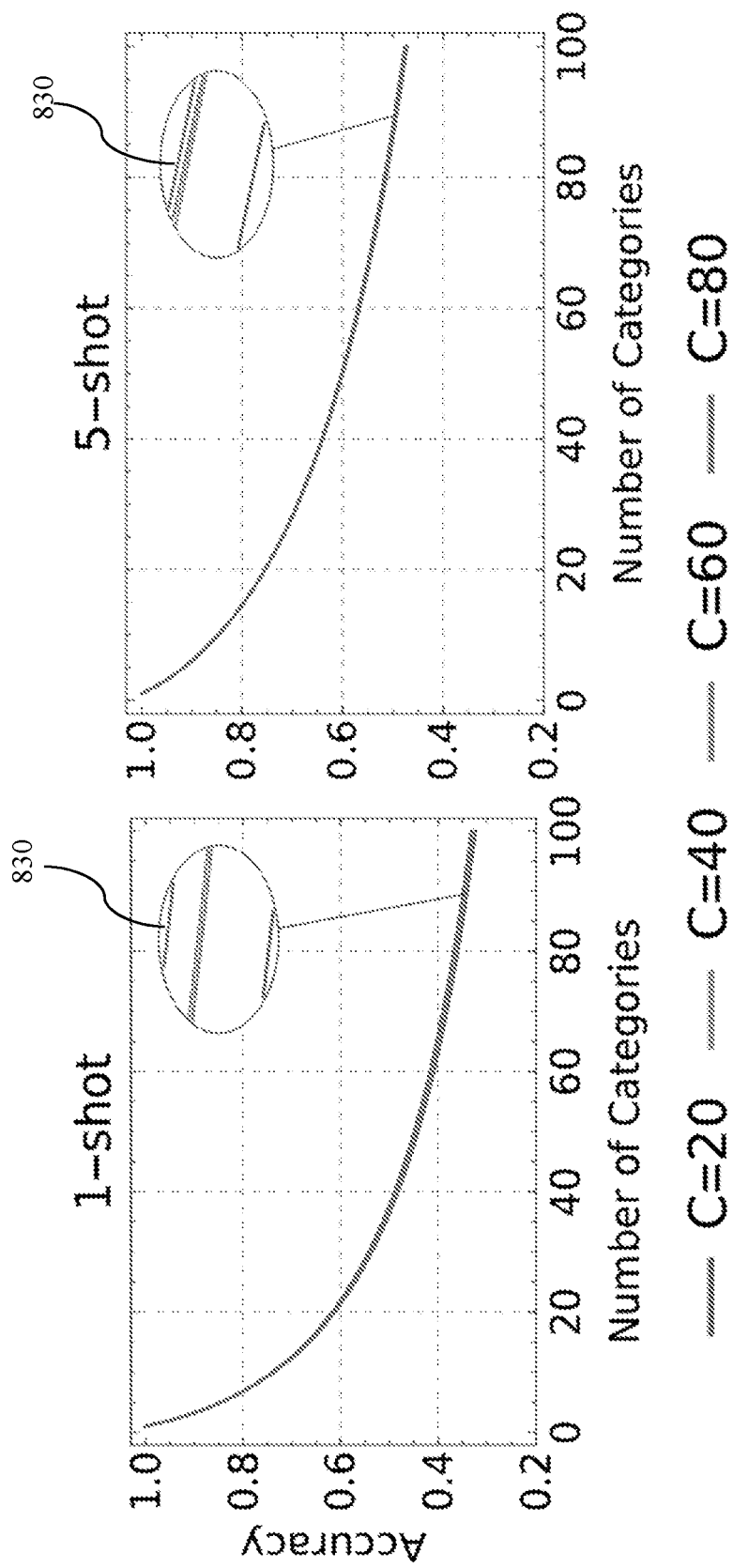
FIG. 8C illustrates the accuracy with different number of support sets in a task.

FIG. 8C illustrates the accuracy with different number C of support sets in a task. In both 1-shot and 5-shot settings, curves of different C overlap with each other. When looking closely to the curves, a larger C (e.g., C 830) yields better but negligible improvement. This indicates that the choice of C has little effect on the performance of the image classification framework. Since it takes a longer time for training with a larger C and the improvement is little, C=20 is used in the following experiments.

In various example embodiments, the image classification framework was evaluated for few-shot incremental class learning on the CUB200-2011 dataset as well as the following three image classification datasets:

(i) CIFAR-100: The CIFAR-100 dataset comprises 100 categories each with 600 images. The dataset is randomly split for 40, 10, and 50 categories as the meta training set, meta validation set, and meta testing set, respectively.

(ii) Flower-102: The Flower-102 dataset comprises 102 flower categories each containing 40 images to 258 images. The dataset is randomly split into 42, 10, and 50 categories as the meta training set, meta validation set, and meta testing set, respectively.

(iii) SUN397: The SUN397 dataset comprises 397 scene categories with 108754 images. Each category contains at least 100 images. The dataset is randomly split into 150, 47, and 200 categories as the meta training set, meta validation set, and meta testing set, respectively.

Figure 9:
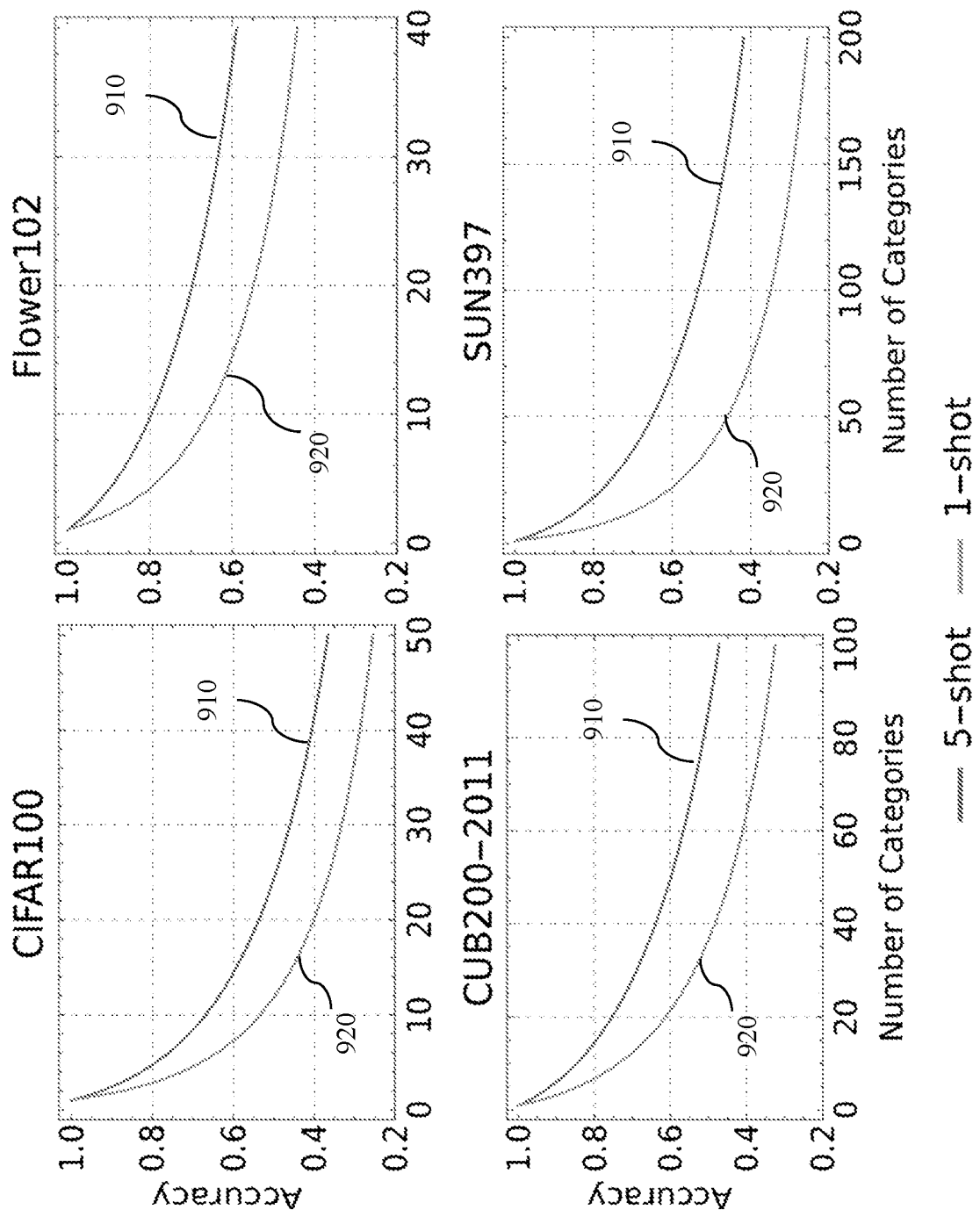
FIG. 9 illustrates the accuracy of the image classification framework on different datasets.

In various example embodiments, the LSTM-based module generator and the spherical category mapping discriminator is used for the image classification framework, and followed the experiment settings as above. FIG. 9 illustrates the 1-shot and 5-shot results on the four datasets. It is observed that 5-shot 910 setting yields better accuracy than the 1-shot 920 setting. Moreover, the accuracy decreases more and more slowly as the number of category increases. Given 5 samples per category, the accuracy with 100 categories on the CUB200-2011 dataset is close to 50%, and the accuracy with 200 categories on the SUN397 dataset is above 40%. This suggests that the image classification framework is promising for few-shot incremental learning.

In various example embodiments, the image classification framework is evaluated on the few-shot classification given a fixed number of categories (e.g., 5 or 20) which is a popular task among recent few-shot learning works. The experiments were carried out on the miniImageNet dataset. This dataset was collected in and applied as the most popular benchmark dataset for few-shot image classification. In various example embodiments, the miniImageNet dataset comprises 64, 16, and 20 different categories in the meta training set, meta validation set, and meta testing set, respectively. Each category comprises 600 images.

In various example embodiments, instead of using a pre-trained model for the feature extractor, the parameters of the feature extractor were learned from scratch on the meta training set. First, a fully connected layer is appended to the feature extractor. Then the parameters of the whole model is randomized and its parameters tuned on the meta training set $\mathcal{D}_{meta\text{-}train}$ by solving a traditional classification problem using back-propagation. The trained network without the appended fully connected layer is used as the feature extractor. To guarantee a fair comparison with other methods, the 64 training categories of miniImageNet was used to obtain the feature extractor.

For the experiment setup, the same experiment settings as described above in the Sections Dataset, Feature Extractor and Meta-Training Hyperparameters are followed during the meta training phase. For the meta testing phase, the classification accuracy was measured under the N-way K-shot settings. In various example embodiments, N categories were randomly selected among all categories in $\mathcal{D}_{meta\text{-}test}$ with each category having K random training samples and 15 random testing samples. Subsequently, N category mapping discriminators were generated by feedforwarding the training samples to the module generator and were plugged into the classification network. Finally, the accuracy of the N-class (or N-category) was evaluated on the testing samples. Such an evaluation was repeated 600 times, and the mean accuracy with 95% confidence intervals was recorded.

FIG. 10 shows the average classification accuracy among all the compared methods on the miniImageNet dataset. For the 5-way classification, the image classification framework achieves the state-of-the-art accuracy, and for the 20-way classification, the image classification framework achieves the highest reported accuracy among the compared methods. This suggests that even though the image classification framework according to various embodiments of the present invention is not specially designed to solve the few-shot classification problem under a fixed number of categories, it is still promising for the problem.

To show the efficiency of category mapping discriminator generation (or meta module generation), the time spent to generate one category mapping discriminator with 5 samples was measured on two types of devices including an NVIDIA TITAN Xp GPU and an Intel i7-6800K CPU. The measurement was conducted for 1,000 rounds, and the mean together with the standard deviation were calculated as shown in Table 1 as follows.

TABLE 1

| Device | GPU | CPU |
| --- | --- | --- |
| Time (ms) | 13.64 ± 0.76 | 1546.30 ± 23.97 |

Not surprisingly, category mapping discriminator generation on GPU is much faster (e.g., about 100×) than on CPU. Most importantly, it takes only about 1.5 seconds to generate a category mapping discriminator on CPU, which means that a category mapping discriminator may be generated in almost real-time for practical applications using a common CPU computer. Compared to other incremental learning methods such as iCaRL that requires to retrain the classification model with plenty of samples from new and old categories, the time for adding new categories into the classification network or classifier using the module generator is significantly reduced. The ability of using CPU for real-time incremental learning with only a few samples will help to solve many real-world problems. For example, when a robot is going to a new place, it may have to learn to recognize the new place quickly without collecting a lot of samples from the new place and redo the training process. For visual recognition of products in an unmanned supermarket for a grab and go kind of application, the image classification framework according to various embodiments of the present invention may be a potential solution to register new products incrementally and remove obsolete products quickly and easily.

Accordingly, an image classification framework based on a meta learning method, which may be referred as Meta Module Generation (MetaMG) is provided to address the few-shot incremental learning problem. Through optimization, the module generator is capable to generate a category mapping discriminator from one or a few samples for a scalable classification network to recognize a new category. The mapping discriminator generation process is fast as the training samples only need to be feedforwarded through the module generator once. Comprehensive experiments on four datasets have shown that the image classification framework achieves promising accuracy for incremental class learning using one or a few samples from each category. Further experiments conducted on the miniImageNet dataset have suggested that even though the image classification framework is not specially designed for the N-way K-shot learning problem, it may still achieve the cutting edge performance.

The image classification framework based on meta learning comprises two optimization methods. The two optimization methods may be referred to as a one-class optimization method and an incremental optimization method, respectively. In various example embodiments, a one-class optimization method aims to enable the module generator to generate a category mapping discriminator that gives high scores for in-category samples and low-scores for out-category samples. In this way, each category mapping discriminator represents a non-linear decision boundary that encloses the region belonging to the category in the feature space. In various example embodiments, an incremental optimization method aims to align the meta training condition with the incremental meta testing condition where the number of categories is varying. This method enables the module generator to generate category mapping discriminators that discriminate arbitrary number of categories by jointly partitioning the feature space into different regions for different categories.

Figure 11:
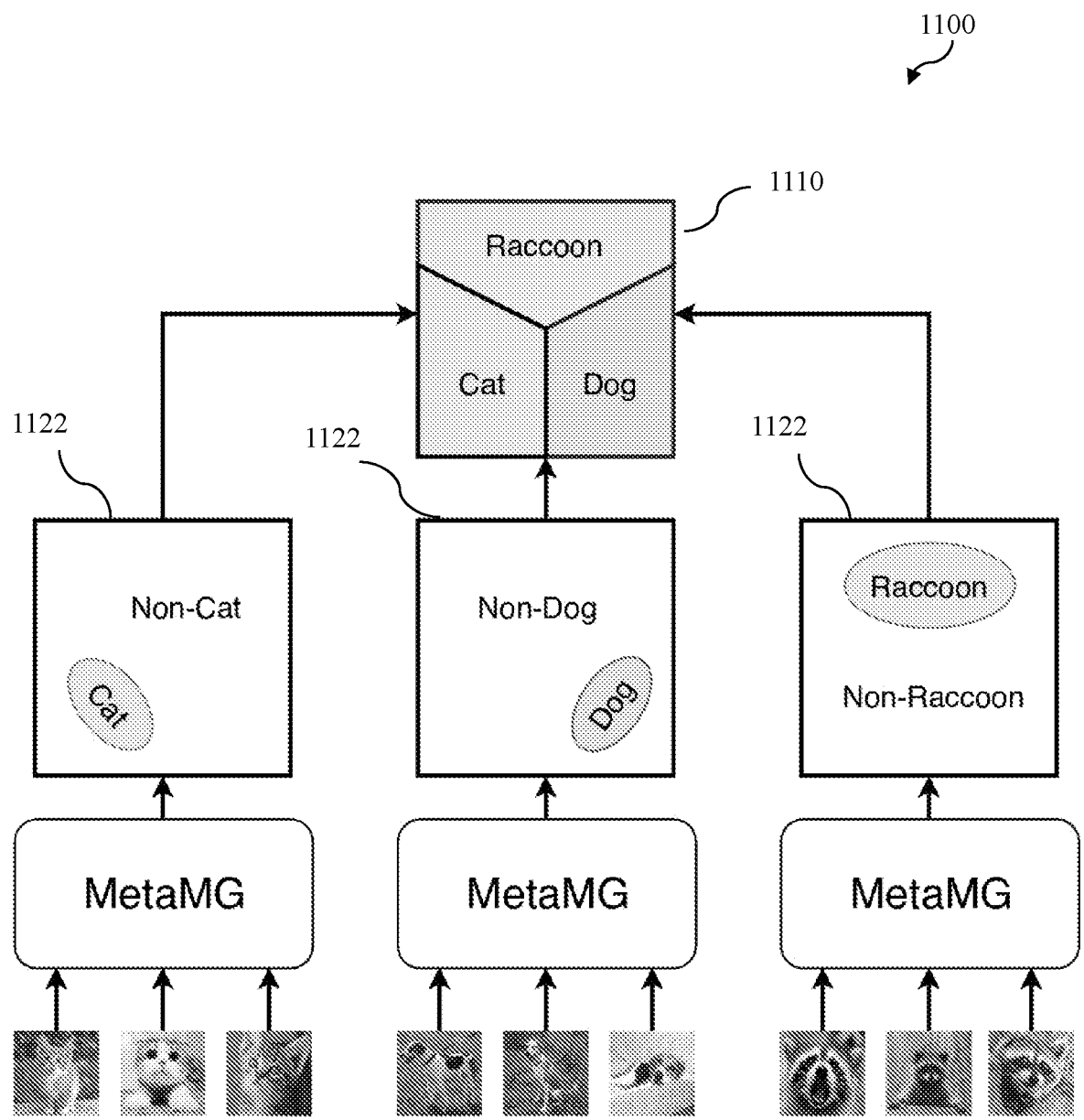
FIG. 11 illustrates another exemplary image classification framework according to various example embodiments of the present invention.

FIG. 11 illustrates a classification framework 1100 which jointly adapts all the category mapping discriminators 1122 together to partition a feature space 1110 into different regions for different categories.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A computer-implemented method of image classification using at least one processor, the method comprising:
providing a set of category mapping discriminators, each corresponding to a respective category, wherein each category mapping discriminator of the set of category mapping discriminators is configured for discriminating features relating to input images that belong to the respective category of the category mapping discriminator;
extracting a plurality of features from an input image using a machine learning model;
determining, for each of the set of category mapping discriminators, an output value based on the plurality of extracted features using the category mapping discriminator; and
determining a classification of the input image based on the output values of the set of category mapping discriminators,
wherein said providing a set of category mapping discriminators further comprises generating one or more new category mapping discriminators corresponding to one or more new categories, respectively, each new category mapping discriminator is configured for discriminating features relating to input images that belong to the respective new category of the new category mapping discriminator, and incorporating the one or more new category mapping discriminators into the set of category mapping discriminators to obtain an updated set of category mapping discriminators.

2. The method of claim 1, wherein the set of category mapping discriminators are each configured to separate a feature space into different regions each associated to a respective category of a corresponding category mapping discriminator, and each category mapping discriminator is configured to serve as a non-linear decision boundary that encloses a region belonging to the respective category of the category mapping discriminator in the feature space.

3. The method of claim 1, wherein the set of category mapping discriminators each comprises a corresponding set of parameters configured for identifying features relating to input images that belong to the respective category of the category mapping discriminator.

4. The method of claim 1, wherein each category mapping discriminator of the set of category mapping discriminators is configured to generate a high output value based on the features relating to input images that belong to the respective category corresponding to the category mapping discriminator and a low output value based on the features relating to input images that do not belong to the respective category.

5. The method of claim 4, wherein said determining a classification for the input image based on the output values of the set of category mapping discriminators comprises determining a label associated to the category for the input image based on a corresponding category mapping discriminator having the highest output value among the set of category mapping discriminators.

6. The method of claim 1, wherein said generating one or more new category discriminators is based on a meta learning model using a training dataset in relation to the one or more new categories.

7. The method of claim 6, wherein the training dataset comprises a set of tasks, each task comprising a training set and a testing set.

8. The method of claim 6, wherein the meta learning model correlates a plurality of sample features from the training set in relation to a new category and maps the plurality of sample features to parameters of a new category mapping discriminator.

9. The method of claim 1, wherein the machine learning model comprises a neural network.

10. A system for image classification, the system comprising:
a memory; and
at least one processor communicatively coupled to the memory and configured to:

provide a set of category mapping discriminators, each corresponding to a respective category, wherein each category mapping discriminator of the set of category mapping discriminators is configured for discriminating features relating to input images that belong to the respective category of the category mapping discriminator;

extract a plurality of features from an input image using a machine learning model;

determine, for each of the set of category mapping discriminators, an output value based on the plurality of extracted features using the category mapping discriminator; and determine a classification of the input image based on the output values of the set of category mapping discriminators, wherein said providing a set of category mapping discriminators further comprises generating one or more new category mapping discriminators corresponding to one or more new categories, respectively, each new category mapping discriminator is configured for discriminating features relating to input images that belong to the respective new category of the new category mapping discriminator, and incorporating the one or more new category mapping discriminators into the set of category mapping discriminators to obtain an updated set of category mapping discriminators.

11. The system according to claim 10, wherein the set of category mapping discriminators are each configured to separate a feature space into different regions each associated to a respective category of a corresponding category mapping discriminator, and each category mapping discriminator is configured to serve as a non-linear decision boundary that encloses a region belonging to the respective category of the category mapping discriminator in the feature space.

12. The method of claim 10, wherein the set of category mapping discriminators each comprises a corresponding set of parameters configured for identifying features relating to input images that belong to a respective category of the category mapping discriminator.

13. The system according to claim 10, wherein each category mapping discriminator of the set of category mapping discriminators is configured to generate a high output value based on features relating to input images that belong to a respective category corresponding to the category mapping discriminator and a low output value based on features relating to input images that does not belong to the respective category.

14. The system according to claim 13, wherein said determining a classification for the input image based on the output values of the set of category mapping discriminators comprises determining a label associated to a category for the input image based on a corresponding category mapping discriminator having the highest output value among the set of category mapping discriminators.

15. The system of claim 10, wherein said generating one or more new category discriminators is based on a meta learning model using a training dataset in relation to the one or more new categories.

16. The system of claim 15, wherein the training dataset comprises a set of tasks, each task comprising a training set and a testing set.

17. The system of claim 15, wherein the meta learning model correlates a plurality of sample features from the training dataset in relation to a new category and maps the plurality of sample features to parameters of a new category mapping discriminator.

18. A computer program product, embodied in one or more non-transitory computer-readable storage mediums, comprising instructions executable by at least one processor to perform a method of image classification, the method comprising:

providing a set of category mapping discriminators, each corresponding to a respective category, wherein each category mapping discriminator of the set of category mapping discriminators is configured for discriminating features relating to input images that belong to the respective category of the category mapping discriminator;

extracting a plurality of features from an input image using a machine learning model;

determining, for each of the set of category mapping discriminators, an output value based on the plurality of extracted features using the category mapping discriminator; and determining a classification of the input image based on the output values of the set of category mapping discriminators, wherein said providing a set of category mapping discriminators further comprises generating one or more new category mapping discriminators corresponding to one or more new categories, respectively, each new category mapping discriminator is configured for discriminating features relating to input images that belong to the respective new category of the new category mapping discriminator, and incorporating the one or more new category mapping discriminators into the set of category mapping discriminators to obtain an updated set of category mapping discriminators.

* * * * *